(12) United States Patent
Sumitomo

(10) Patent No.: US 7,262,933 B2
(45) Date of Patent: Aug. 28, 2007

(54) MAGNETIC RECORDER/REPRODUCER WITH FREELY DETACHABLE MAGNETIC TAPE FOR ENGAGING A GUIDE POST WHICH TRACES A PATH THROUGH A NOTCH IN A TAKE-UP REEL

(75) Inventor: Koji Sumitomo, Matsuyama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 166 days.

(21) Appl. No.: 10/532,803

(22) PCT Filed: Nov. 4, 2003

(86) PCT No.: PCT/JP03/14082

§ 371 (c)(1),
(2), (4) Date: Apr. 25, 2005

(87) PCT Pub. No.: WO2004/042718

PCT Pub. Date: May 21, 2004

(65) Prior Publication Data

US 2006/0002003 A1    Jan. 5, 2006

(30) Foreign Application Priority Data

Nov. 7, 2002 (JP) .............................. 2002-323237

(51) Int. Cl.
*G11B 5/027* (2006.01)

(52) U.S. Cl. .................. 360/85; 360/95; 242/332.8; 242/348

(58) Field of Classification Search ............ 360/85, 360/95; 242/348, 332.8
See application file for complete search history.

(56) References Cited

U.S. PATENT DOCUMENTS 6,433,953 B1 * 8/2002 Taki et al. ................ 360/85

FOREIGN PATENT DOCUMENTS

| JP | 05303801 | 4/1992 |
|----|----------|--------|
| JP | 06103649 | 9/1992 |
| JP | 06349167 | 6/1993 |
| JP | 9-500753 | 6/1994 |
| JP | WO95/03605 | 6/1994 |

* cited by examiner

Primary Examiner—A. J. Heinz
(74) Attorney, Agent, or Firm—Steptoe & Johnson LLP.

(57) ABSTRACT

The hub of a take-up reel (20) has a notch (20b) which is formed so as to correspond to the moving paths of guide posts (33, 34, 35) passing between a rotating drum type magnetic head (10) and the take-up reel (20). With this configuration, the magnetic head (10) and the take-up reel (20) can be disposed close to each other, thereby reducing the plane installation area of a magnetic recording/reproducing apparatus in the longitudinal direction.

3 Claims, 12 Drawing Sheets

PRIOR ART

MAGNETIC RECORDER/REPRODUCER WITH FREELY DETACHABLE MAGNETIC TAPE FOR ENGAGING A GUIDE POST WHICH TRACES A PATH THROUGH A NOTCH IN A TAKE-UP REEL

The present application is based on International Application No. PCT/JP2003/14082, filed Nov. 4, 2003, which application is incorporated herein by reference in its entirety.

TECHNICAL FIELD

The present invention relates to a magnetic recording/reproducing apparatus which performs recording and reproduction on a single reel cartridge.

BACKGROUND ART

Magnetic recording/reproducing apparatuses for performing recording and reproduction on a so-called single reel cartridge, in which a magnetic tape is wound around a single reel and stored, have been already known. As compared with a two-reel cartridge comprising a supply reel and a take-up reel, the single reel cartridge does not have a take-up reel therein, thereby achieving a compact cartridge.

In the single reel cartridge, as shown in FIGS. 10(a) and 10(b), a leader block 3 is provided on the leading edge of a magnetic tape 2 stored in a cartridge 1. Then, the cartridge 1 is loaded by means of a cassette loading mechanism (not shown) in A direction and is stored on a predetermined position. From this state, the leader block 3 is transported to a take-up reel 6 via a guide post 4 and a recording head 5.

Two methods are mainly used for transporting the leader block 3 to the take-up reel 6 as follows:

1. A hook is attached to the end of a lead-in tape connected to the take-up reel 6, the hook catches the leader block 3, the leader block 3 is moved to the take-up reel 6 via the lead-in tape in this state, and the leader block 3 is locked in the take-up reel 6.

2. A transporting/connecting mechanism called a transport is provided, the leader block 3 is chucked by a pin and the like provided in the transporting/connecting mechanism, and the leader block 3 is moved to the take-up reel 6 by means of a lever and a rail provided in the transporting/connecting mechanism.

In this configuration, a fixed magnetic head shown in FIGS. 10(a) and 10(b) has been conventionally used as the recording head 5 which performs recording and reproduction on the magnetic tape 2. Instead, the use of a rotating drum type magnetic head is proposed for high density recording (e.g., Japanese Patent Laid-Open No. 5-303801, Japanese Patent Laid-Open No. 6-103649).

As shown in FIGS. 11(a) and 11(b), a conventional magnetic recording/reproducing apparatus using the single reel cartridge 1 and a rotating drum type magnetic head is configured as follows: in plan view, the rotating drum type magnetic head (hereinafter referred to as a rotary magnetic head) 10 is disposed at the center, the single reel cartridge 1 is disposed so as to be stored on the upstream side (left side in FIG. 11) and the take-up reel 6 is disposed in the rear (right side in FIG. 11) while predetermined intervals are provided on both sides of the rotary magnetic head 10. Further, a transporting/connecting mechanism 11 for transporting the leader block 3 of the cartridge 1 is disposed from the installation position of the cartridge 1 to the center of the take-up reel 6 (FIG. 11 schematically shows the installation position of the transporting/connecting mechanism 11). On one side of the take-up reel 6, a notch 6a is formed only on a part corresponding to the moving path of a grabber for catching the leader block 3 of the cartridge 1 in the vicinity of the center of the take-up reel 6. Reference numeral 7 denotes a supply reel which is disposed in the cartridge 1 and has the magnetic tape 2 wound thereon.

After the leader block 3 of the cartridge 1 is locked into the take-up reel 6, as shown in FIG. 12, a plurality of guide posts (tape guide rollers 12 and 13 for winding the magnetic tape 2 around the rotary magnetic head 10, a pinch roller 15 for pressing the magnetic tape 2 onto a capstan 14a serving as the axis of rotation of a capstan motor. 14, and a guide roller 16 for guiding the magnetic tape 2 from the take-up reel 6 to the capstan 14a) are moved along predetermined moving paths a and b. With these operations, the magnetic tape 2 is wound around the rotary magnetic head 10 and the magnetic tape 2 is transported by the capstan 14a at a predetermined speed, and information on the magnetic tape 2 is read and written by the rotary magnetic head 10.

However, in the case where the single reel cartridge 1 is used in the magnetic recording/reproducing apparatus having the rotary magnetic head 10, the rotary magnetic head 10 has to be separated from the take-up reel 6 in consideration of the maximum winding diameter of the take-up reel 6, and the rotary magnetic head 10 and the take-up reel 6 have to be disposed somewhat apart from each other in consideration of the moving paths a and b not permitting some of the guide posts (the tape guide rollers 12 and 13, the pinch roller 15, the guide roller 16, and so on) to interfere with the hub and the like of the take-up reel 6 when the guide posts for drawing the magnetic tape 2 are moved. Therefore, the length of the overall product serving as the magnetic recording/reproducing apparatus is larger than the magnetic recording/reproducing apparatus comprising the recording head 5 of a fixed head type. Particularly, the apparatus has a large length L1 in the longitudinal (depth) direction along which a part for storing the cartridge. 1, the rotary magnetic head 10, and the take-up reel 6 are arranged, as seen in plan view, and thus the apparatus has a large plane installation area. Hence, the magnetic recording/reproducing apparatus is increased in size.

DISCLOSURE OF THE INVENTION

In order to solve the problem, a magnetic recording/reproducing apparatus according to claim 1 of the present invention, in which a single reel cartridge having stored a magnetic tape is freely attached and detached, comprises a take-up reel for winding up a magnetic tape, a rotating drum type magnetic head for performing recording and reproduction on the magnetic tape, a capstan motor for transporting the magnetic tape at a predetermined speed, a transporting/connecting mechanism for transporting and connecting a leading edge of the magnetic tape to the take-up reel when the cartridge is mounted, and a plurality of guide posts which are disposed at predetermined unloading positions when the magnetic tape is not connected to the take-up reel, and after the leading edge of the magnetic tape is connected to the take-up reel, the guide posts are moved to predetermined loading positions, at which the magnetic tape is guided so as to be wound around the rotating drum type magnetic head and is pressed to a capstan rotated by the capstan motor, along predetermined moving paths. The take-up reel has a hub has a notch formed to correspond to the moving path of at least one of the guide posts passing between the rotating drum type magnetic head and the take-up reel.

According to this configuration, when at least one of the guide posts moves between the rotating drum type magnetic head and the take-up reel, the guide post passes through the notch formed on the hub of the take-up reel. Thus, the rotating drum type magnetic head and the take-up reel can be disposed close to each other.

According to the invention of claim 2, the magnetic recording/reproducing apparatus of claim 1 is so characterized that when the magnetic tape is wound around the take-up reel for a predetermined diameter or larger, the guide posts are prohibited from moving to the unloading positions and are permitted to move only to half loading positions which do not interfere with the magnetic tape wound around the take-up reel.

With this configuration, during fast forwarding and rewinding, the guide posts are moved to the half loading positions. Thus, fast forwarding and rewinding can be performed without any problems.

According to the invention of claim 3, the magnetic recording/reproducing apparatus of claim 1 or 2 is so characterized that when the magnetic tape is wound around the take-up reel for a predetermined diameter or larger, the magnetic tape is completely wound up into the cartridge and then the guide posts are moved to the unloading positions when an instruction to eject the cartridge is issued.

With this configuration, when an instruction to eject the cartridge is issued, the magnetic tape is completely wound up into the cartridge and then the guide posts are moved to the unloading positions, so that a return is made to a standby state without any problems.

A magnetic recording/reproducing apparatus according to claim 4 of the present invention, in which a single reel cartridge having stored a magnetic tape is freely attached and detached, comprises a take-up reel for winding up a magnetic tape, a rotating drum type magnetic head for performing recording and reproduction on the magnetic tape, a capstan motor for transporting the magnetic tape at a predetermined speed, a transporting/connecting mechanism for transporting and connecting a leading edge of the magnetic tape to the take-up reel when the cartridge is mounted, a plurality of guide posts which are disposed at predetermined unloading positions when the magnetic tape is not connected to the take-up reel, and after the leading edge of the magnetic tape is connected to the take-up reel, the guide posts are moved to predetermined loading positions, along predetermined moving paths, at which the magnetic tape is guided to be wound around the rotating drum type magnetic head and pressed to a capstan rotated by the capstan motor. The take-up reel and the cartridge overlap each other as seen in plan view taken along the thickness direction of the cartridge, and are located at different positions in a vertical direction.

With this configuration, in plan view taken along the thickness direction of the cartridge, the take-up reel and the cartridge overlap each other, so that it is possible to reduce the installation area of the magnetic recording/reproducing apparatus as seen in plan view.

BEST MODE FOR CARRYING OUT THE INVENTION

The following will describe embodiments of the present invention in accordance with the accompanying drawings.

Figure 1:
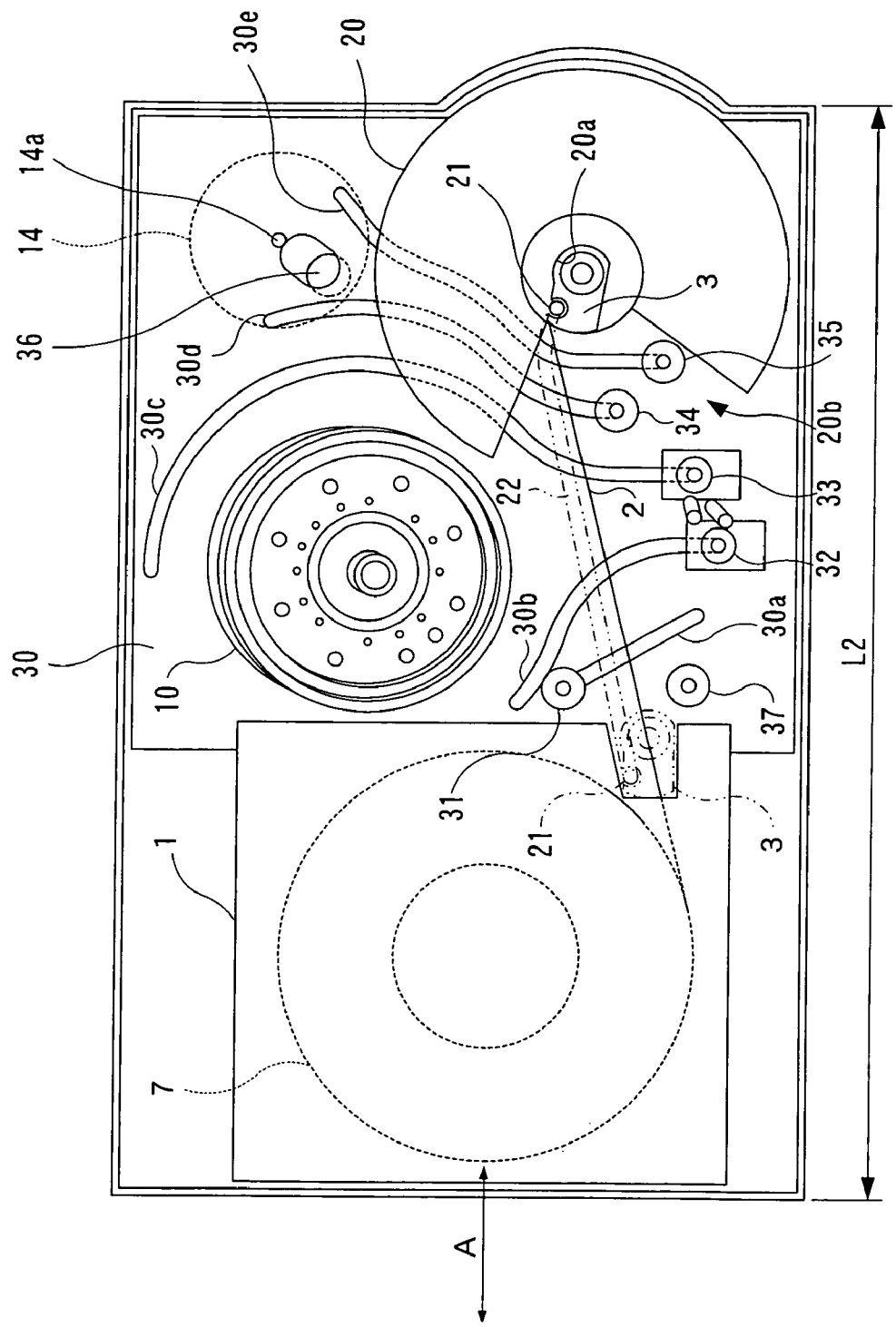
FIG. 1 is a plan view schematically showing a magnetic recording/reproducing apparatus according to an embodiment of the present invention in an unloading state where a cartridge is stored and a leader block is transported to a winding reel.
Figure 2:
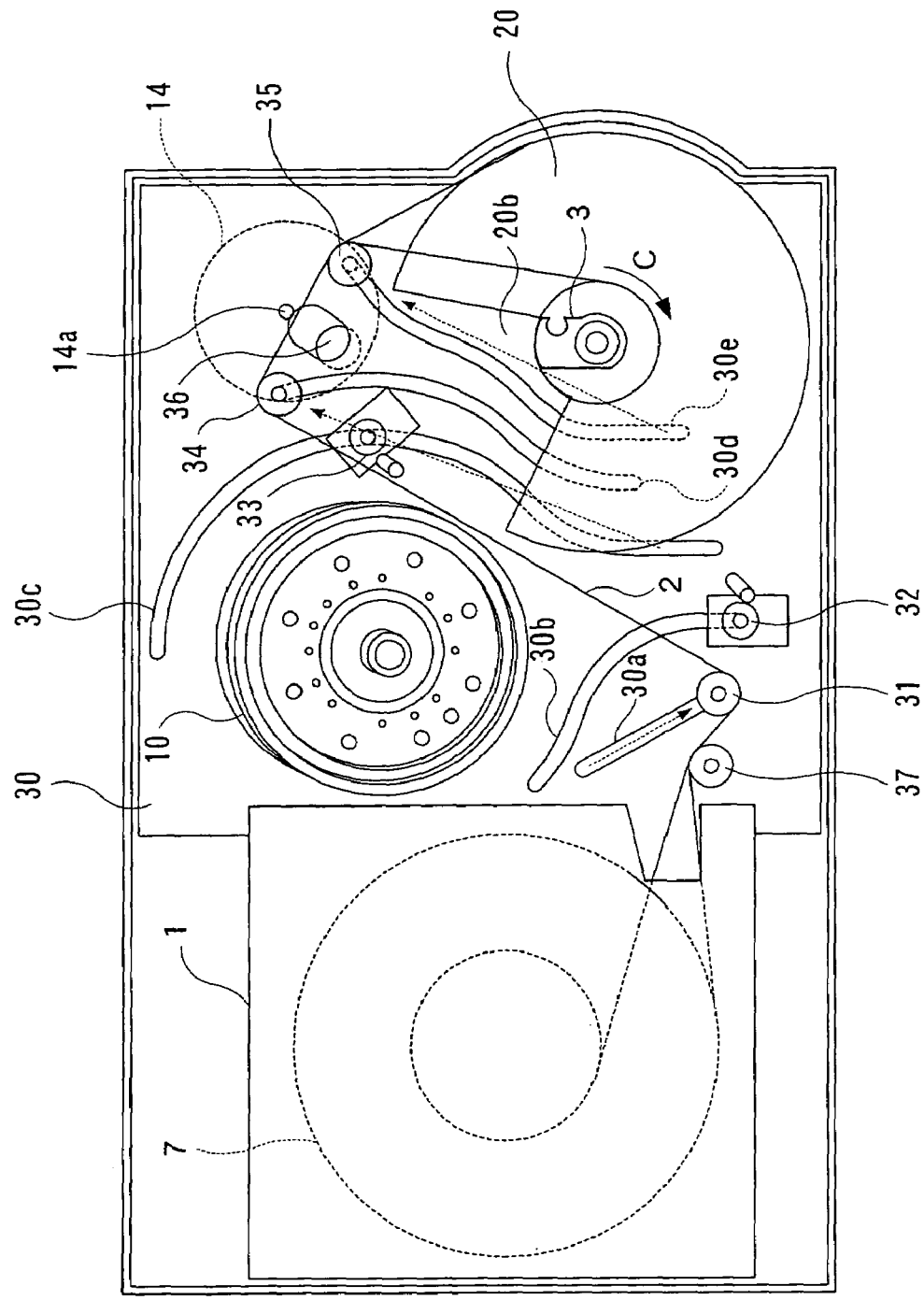
FIG. 2 is a plan view schematically showing a half loading state of the magnetic recording/reproducing apparatus.
Figure 3:
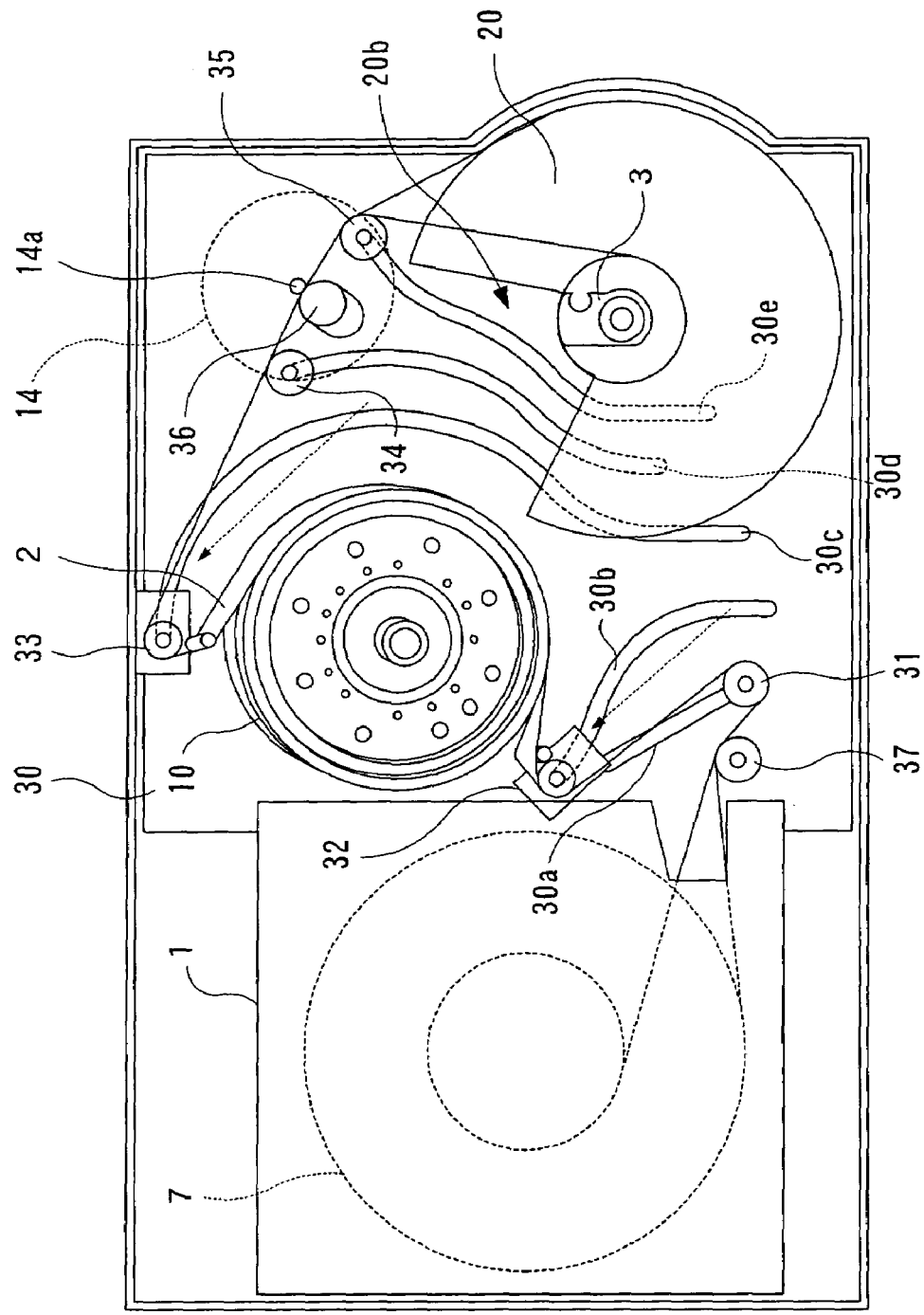
FIG. 3 is a plan view schematically showing a loading state of the magnetic recording/reproducing apparatus.
Figure 4:
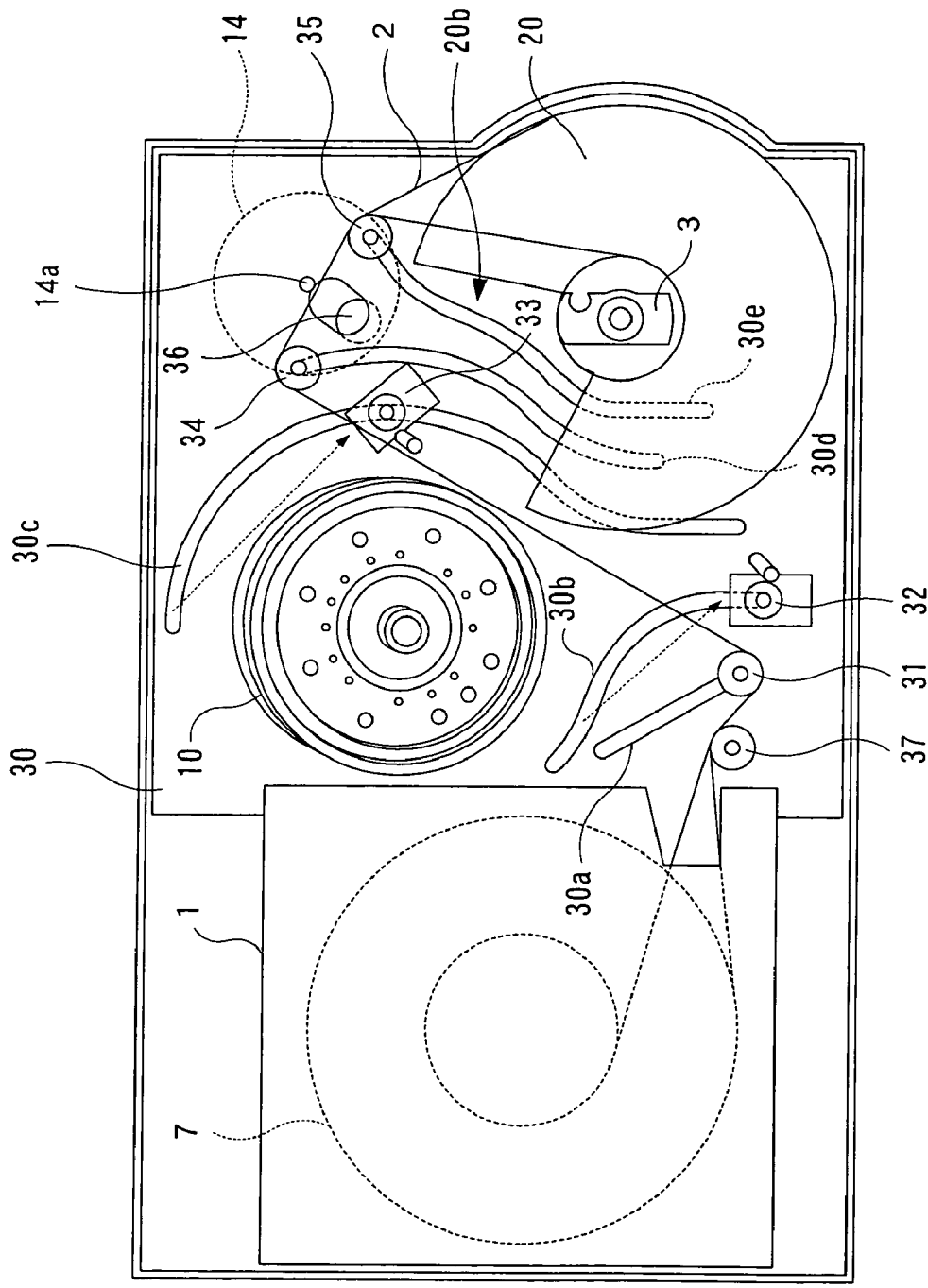
FIG. 4 is a plan view schematically showing a half loading state of the magnetic recording/reproducing apparatus.
Figure 5:
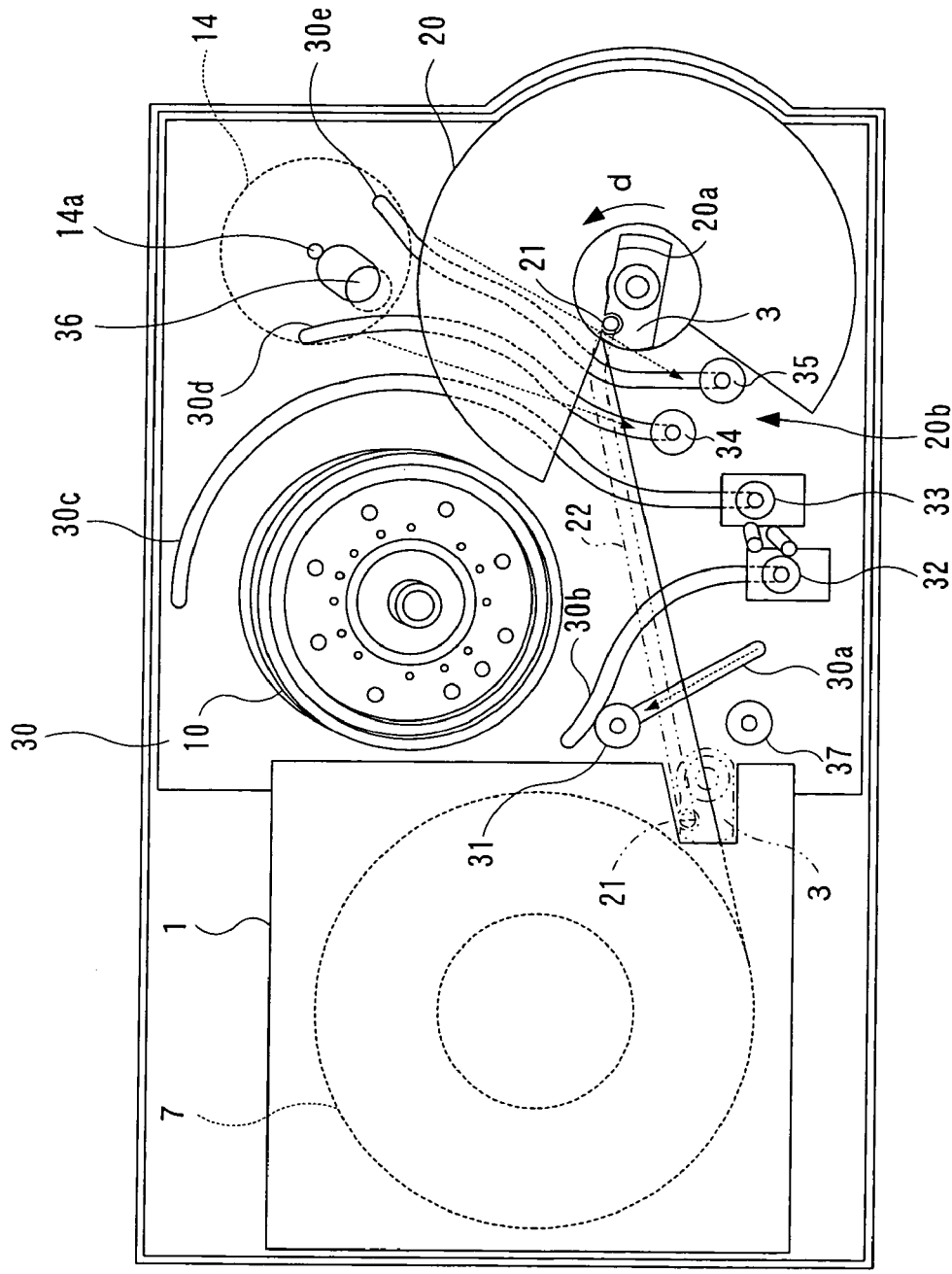
FIG. 5 is a diagram showing an unloading state before the leader block of the magnetic recording/reproducing apparatus is detached from a take-up reel.

FIGS. 1 to 5 are plan views schematically showing a magnetic recording/reproducing apparatus according to an embodiment of the present invention. FIG. 1 shows an unloading state where a cartridge is stored and a leader block is transported to a take-up reel. FIG. 2 shows that an unloading state is switched to a half loading state. FIG. 3 shows a loading state. FIG. 4 shows that the loading state is switched to the half loading state. FIG. 5 shows an unloading state before the leader block is detached from the take-up reel. In the present embodiment, the side for storing the cartridge (left side in FIGS. 1 to 5) is referred to as an upstream side (front side). The constituent elements having substantially the same functions are indicated by the same reference numerals.

As shown in FIG. 1, in the magnetic recording/reproducing apparatus according to the present embodiment of the present invention, a single reel cartridge 1 (having only a supply reel 7) which has stored a magnetic tape 2 is disposed so as to be freely attached and detached in A direction. Further, a leader block 3 is attached to the leading edge of the magnetic tape 2.

The magnetic recording/reproducing apparatus comprises a take-up reel 20 for taking up the magnetic tape 2, a rotating drum type magnetic head (hereinafter referred to as a rotary magnetic head) 10 for performing recording and reproduction on the magnetic tape 2, a capstan motor 14 for transporting the magnetic tape 2 at a predetermined speed, a transporting/connecting mechanism (the present embodiment only shows (FIG. 1) an engaging claw 21 which is engaged in the leader block 3 and a transfer rail 22 which guides the engaging claw 21 along a moving path, and members other than the engaging claw 21 of the transporting/connecting mechanism are disposed above a point on a chassis 30 of the magnetic recording/reproducing apparatus in which the cartridge 1 and so on are stored) which takes up the leader block 3, which has been attached to the leading edge of the magnetic tape 2, to an engaged concave portion 20*a* of the take-up reel 20 and connects the leader block 3 to the engaged concave portion 20*a* when the cartridge 1 is mounted, and a plurality of guide posts which wind the magnetic tape 2 around the rotary magnetic head 10 and presses the magnetic tape 2 to a capstan 14*a* of the capstan motor 14.

In this configuration, the rotary magnetic head 10 is disposed substantially at the center of the magnetic recording/reproducing apparatus in plan view and the single reel cartridge 1 is disposed on the upstream side of the rotary magnetic head 10 so as to be stored in the apparatus. The take-up reel 20 is disposed in the rear of the rotary magnetic head 10.

The guide posts are constituted of a fixed guide roller 37 which is fixed on a predetermined position and guides the magnetic tape 2 having just been transported from the cartridge 1, a guide roller 31 which can move along a first guide groove 30*a* formed on the chassis 30 and serves as a first guide post for guiding the magnetic tape 2 having just been transported from the cartridge 1, first and second tape guide rollers 32 and 33 which can move along second and third guide grooves 30*b* and 30*c* formed on the chassis 30 and serve as second and third guide posts for winding the magnetic tape 2 around the rotary magnetic head 10 at a predetermined angle, first and second guide rollers 34 and 35 which can move along fourth and fifth guide grooves 30*d* and 30*e* formed on the chassis 30 and serve as fourth and fifth guide posts for guiding the magnetic tape 2 to the capstan 14*a*, and a pinch roller 36 which can move in a predetermined direction, can move up and down, and serves as a sixth guide post for causing the magnetic tape 2 to slidably contact with the capstan 14*a*. Besides, the guide posts (not shown) other than the fixed guide roller 37 are moved along the guide grooves 30*a* to 30*e* by means of a driving mechanism disposed under the chassis 30.

In addition to this configuration, a notch 20*b* is formed on the hub of the take-up reel 2 in the present invention. The notch 20*b* is shaped like a sector corresponding to the third, fourth, fifth guide grooves 30*c*, 30*d*, and 30*e* serving as the moving paths of the second tape guide roller 33 and the first and second guide rollers 34 and 35, which pass between the rotary magnetic head 10 and the take-up reel 20. As shown in FIGS. 1 and 5, in the unloading state where the magnetic tape 2 is not wound around the rotary magnetic head 10, the first and second guide rollers 34 and 35 are disposed in the notch 20*b*.

In this configuration, when the cartridge 1 is stored in the magnetic recording/reproducing apparatus, the engaging claw 21 of the transporting/connecting mechanism moves along the transfer rail 22, takes up the leader block 3 attached to the leading edge of the magnetic tape 2, transports the leader block 3 to the engaged concave portion 20*a* of the take-up reel 20, and connects the leader block 3 to the engaged concave portion 20*a*. When the magnetic tape 2 is drawn thus, as shown in FIG. 1, the guide roller 31 close to a part for storing the cartridge 1 is disposed on the end of the first guide groove 30*a* so as to be close to the rotary magnetic head 10. The first and second tape guide rollers 32 and 33 and the first and second guide rollers 34 and 35 are disposed in the guide grooves 30*b*, 30*c*, 30*d*, and 30*e* so as to be separated from the rotary magnetic head 10.

Thereafter, as shown in FIG. 2, in order to advance to he half loading state serving as a standby state, the guide roller 31 is moved away from the rotary magnetic head 10 along the first guide groove 30*a*. At the same time, while the take-up reel 20 is rotated in c direction, the second tape guide roller 33 is moved to the intermediate position of the third guide groove 30*c* so as to be closer to the rotary magnetic head 10, and the first and second guide rollers 34 and 35 are moved to the ends of the fourth and fifth guide grooves 30*d* and 30*e* so as to be closer to the capstan 14*a*. In this half loading state, the second tape guide roller 33 and the first and second guide rollers 34 and 35 are disposed outside the hub of the take-up reel 2.

When an instruction to read or write is issued in the half loading state, as shown in FIG. 3, the first and second tape guide rollers 32 and 33 are moved to the ends of the second and third guide grooves 30*b* and 30*c* that are closer to the rotary magnetic head 10, and the magnetic tape 2 is kept wound around the rotary magnetic head 10 at a predetermined angle. At the same time, the pinch roller 36 is pressed to the capstan 14*a* with the magnetic tape 2 being sandwiched between the pinch roller 36 and the capstan 14*a*. In this loading state, the capstan 14*a* is rotated to transport the magnetic tape 2 at the predetermined speed. Meanwhile, the rotary magnetic head 10 is rotated to read and write data on the magnetic tape 2. In this embodiment, in a state other than the loading state, the pinch roller 36 is retracted downward (or upward) to a predetermined position so as not to interfere with the magnetic tape 2. Further, in the loading state, the second tape guide roller 33 is disposed so as to widely move around to the part for storing the cartridge 1. Thus, the first tape guide roller 32 does not have to pass between the rotary magnetic head 10 and the part for storing the cartridge 1.

In the loading state, when the magnetic recording/reproducing apparatus receives an instruction to fast-forward and rewind the tape, as shown in FIG. 4, the second tape guide roller 33 and the pinch roller 36 are returned to the half loading state to fast-forward (fast search) and rewind the tape.

Further, when receiving an instruction to eject the cartridge 1, the supply reel 7 and the take-up reel 20 first perform rewinding and then the magnetic tape 2 is completely rewound into the cartridge 1. Thereafter, as shown in FIG. 5, the guide roller 31 is moved in the first guide groove 30*a* so as to be closer to the rotary magnetic head 10. At the same time, while the magnetic tape 2 is rotated in d direction, the second tape guide roller 33 is moved to the end of the third guide groove 3 that is separated from the rotary magnetic head 10, and the first and second guide rollers 34 and 35 are moved to the ends of the fourth and fifth guide grooves 30*d* and 30*e* so as to be separated from the capstan 14*a*, so that the unloading state is made.

In this configuration, the second tape guide roller 33 and the first and second guide rollers 34 and 35 pass through the notch 20*b* formed on the hub of the take-up reel 20 when the unloading state is switched to the half loading state. The rotary magnetic head 10 and the take-up reel 20 can be disposed close to each other as long as the outer periphery of the hub of the take-up reel 20 does not make contact with the rotary magnetic head 10. Further, in the loading state, the second tape guide roller 33 is widely moved around so as to be closer to the part for storing the cartridge 1 and the first tape guide roller 32 is configured so as not to pass between the rotary magnetic head 10 and the part for storing the rotary magnetic head 10, so that the part for storing the cartridge 1 can be closer to the rotary magnetic head 10.

Figure 10:
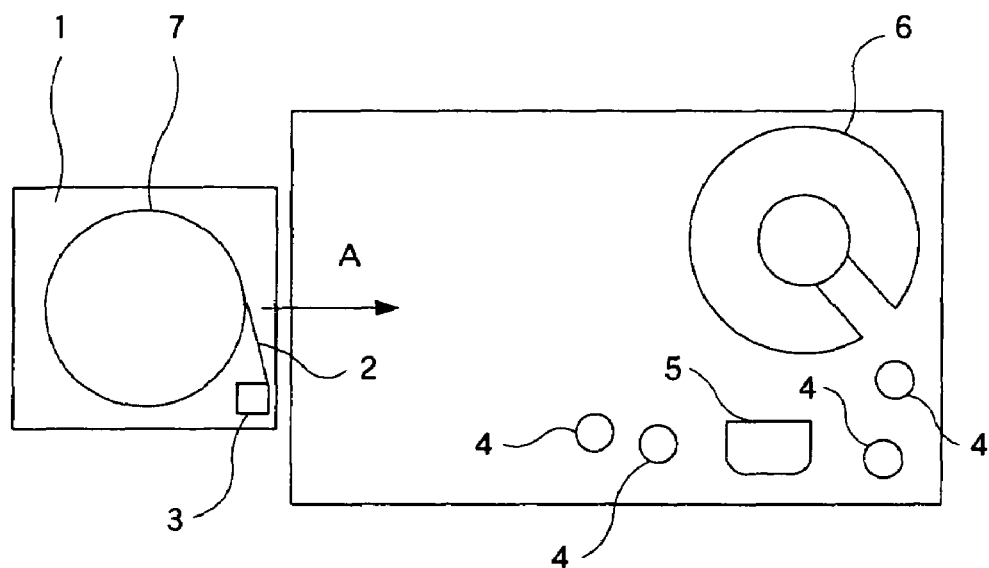
FIGS. 10(a) and 10(b) are planviews schematically showing a conventional magnetic recording/reproducing apparatus, FIG. 10(a) showing that a cartridge is inserted, and FIG. 10(b) showing that the cartridge is stored.
Figure 10:
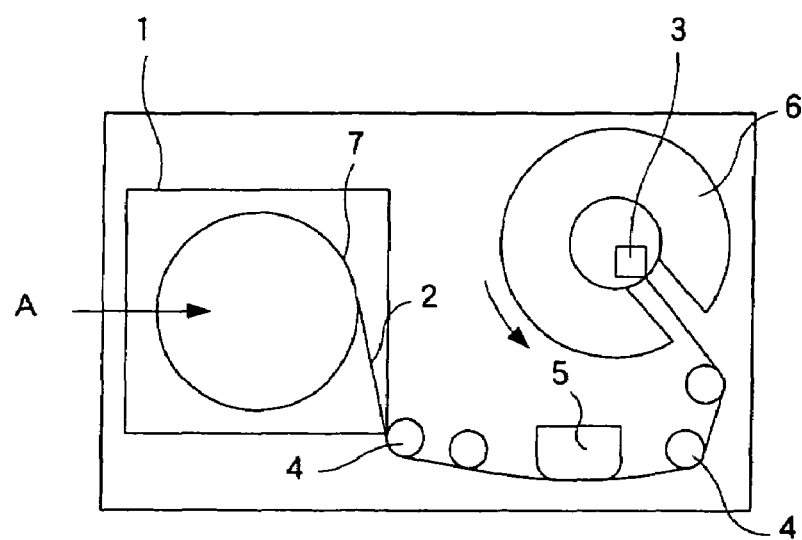
Figure 11:
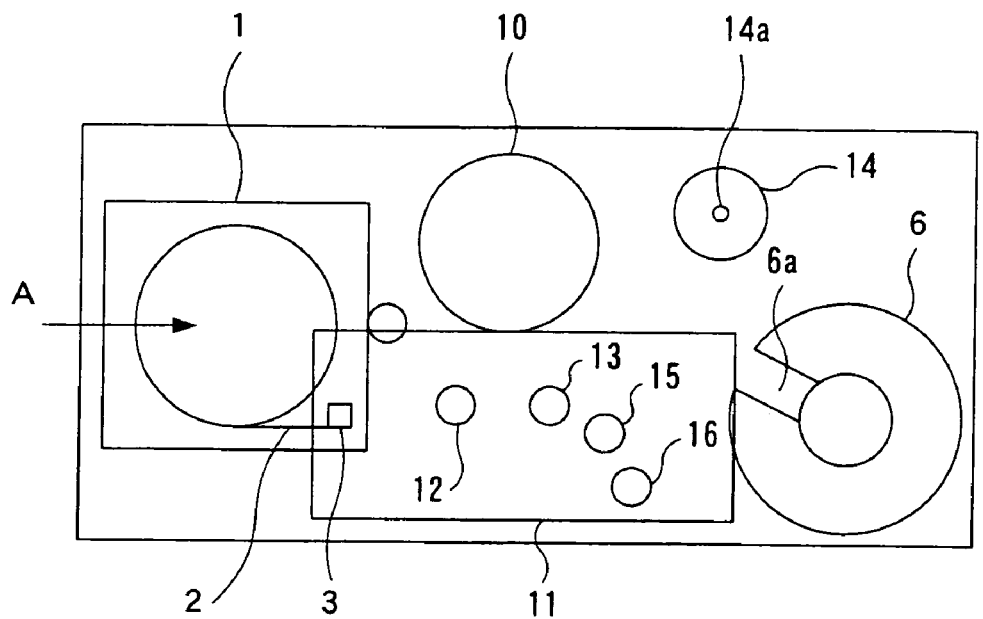
FIGS. 11(a) and 11(b) are plan views schematically showing a conventional magnetic recording/reproducing apparatus having a drum magnetic head, FIG. 11(a) showing that a cartridge is inserted, and FIG. 10(b) showing that the cartridge is stored.
Figure 11:
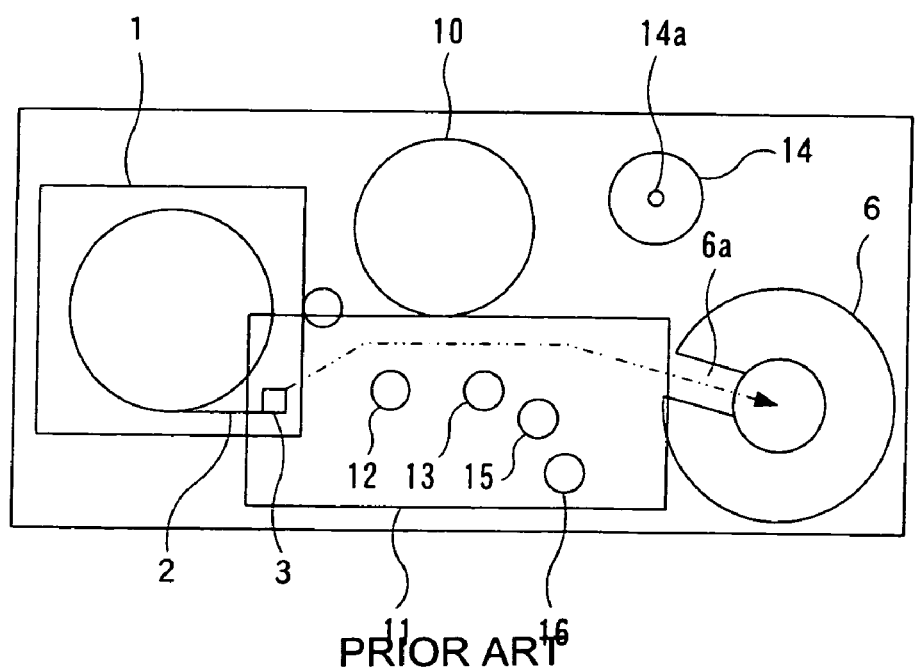
Figure 12:
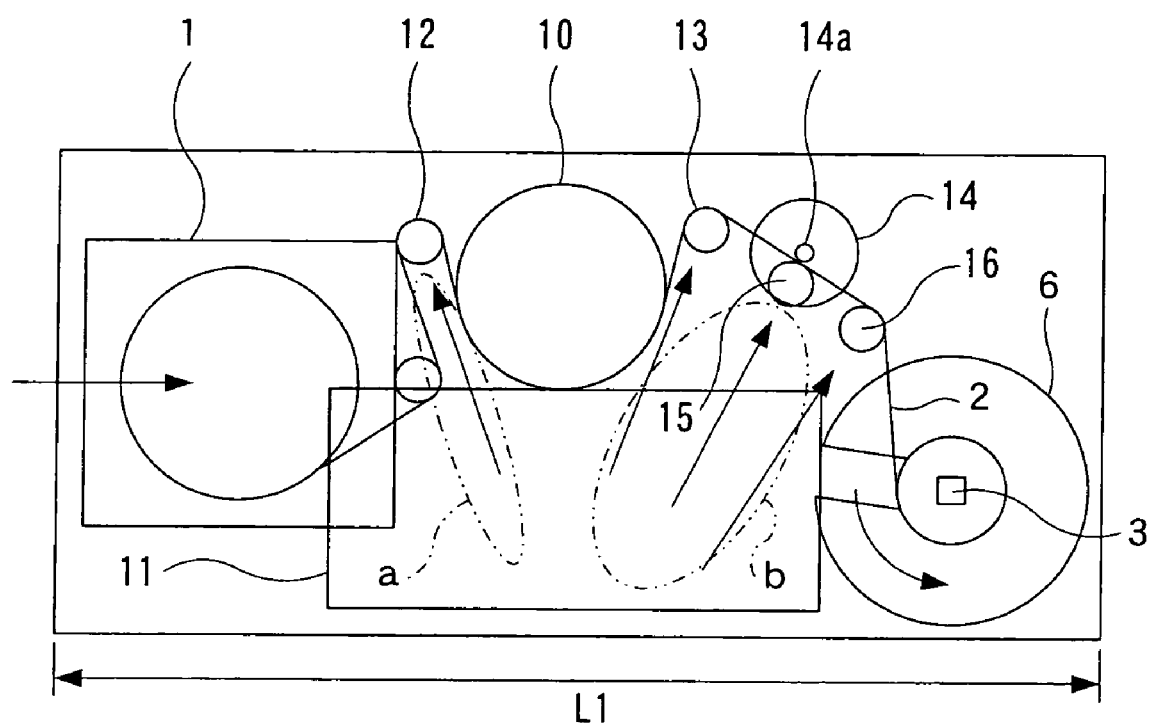
FIG. 12 is a plan view schematically showing the conventional magnetic recording/reproducing apparatus in a loading state.

As a result, as compared with the configuration of FIG. 12, it is possible to shorten the length of the overall product serving as the magnetic recording/reproducing apparatus. Particularly it is possible to reduce a length L2 (FIG. 1) in the longitudinal (depth) direction along which the part for storing the cartridge 1, the rotary magnetic head 10, and the take-up reel 20 are arranged and to reduce a plane installation area (the magnetic recording/reproducing apparatus of the present embodiment in FIGS. 1 to 5 is enlarged from the magnetic recording/reproducing apparatus of FIGS. 10 to 12). Thus, miniaturization can be achieved for a magnetic recording/reproducing apparatus having the rotary magnetic head 10.

Further, when the magnetic tape 2 is wound around the take-up reel 20, the second tape guide roller 33 and the first and second guide rollers 34 and 35 are prohibited from moving to the unloading position and are permitted to move only to the half loading positions which do not interfere with the magnetic tape 2 wound by the take-up reel 20. Thus, fast forwarding and rewinding can be performed without any problems.

Further, when an instruction to eject the cartridge 1 is issued, the magnetic tape 2 is completely wound up into the cartridge 1 and then the second tape guide roller 33 and the first and second guide rollers 34 and 35 are moved to the unloading positions, so that the cartridge 1 can be returned to a standby state enabling ejection and insertion without any problems.

Figure 6:
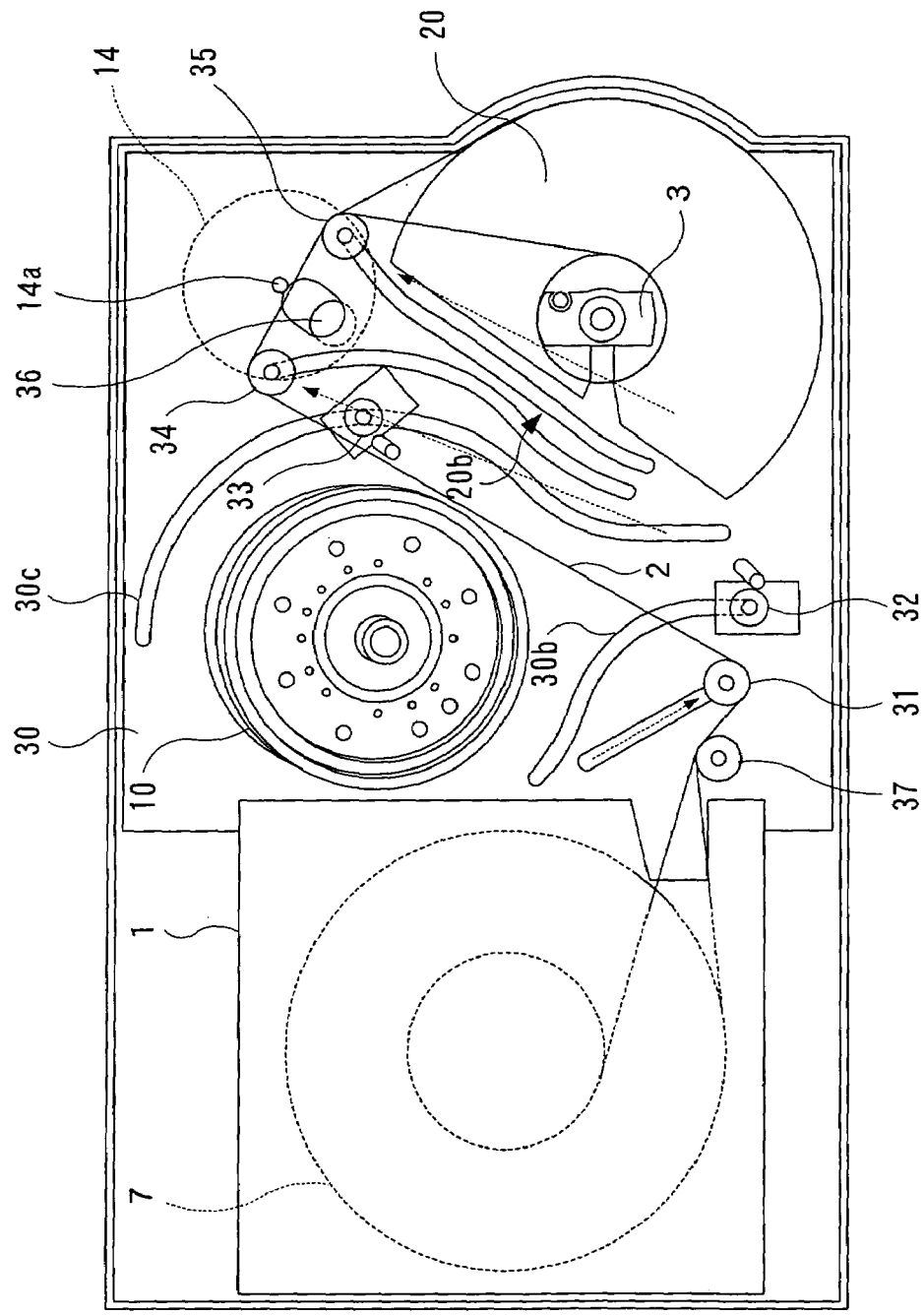
FIG. 6 is a plan view schematically showing a magnetic recording/reproducing apparatus according to another embodiment of the present invention.

The above embodiment described that the notch 20b of the take-up reel 20 is formed like a sector (arc-shaped). The shape of the notch 20b is not limited and a semicircle is also applicable as shown in FIG. 6. Moreover, the notching depth (cutting depth from the outer periphery to the center of the hub) of the notch 20b does not have to reach the center of the hub. Also in this case, it is possible to reduce a distance between the rotary magnetic head 10 and the take-up reel 20 as compared with the absence of the notch 20b. When the notching depth is small, the magnetic tape 2 is wound around the take-up reel 20 for a predetermined diameter (outside diameter at the point where the notch 20b is disposed) or larger. When the magnetic tape 2 is wound out of the notch 20b, the guide posts (the second tape guide roller 33 and the first and second guide rollers 34 and 35) are prohibited from moving to the unloading positions and are permitted to move only to the half loading positions which do not interfere with the magnetic tape 2 wound around the take-up reel 20. In the case of the magnetic tape 2 wound for the predetermined diameter or larger, when an instruction to eject the cartridge 1 is issued, the magnetic tape 2 is completely wound up into the cartridge 1 and then the guide posts are moved to the unloading positions.

Figure 7:
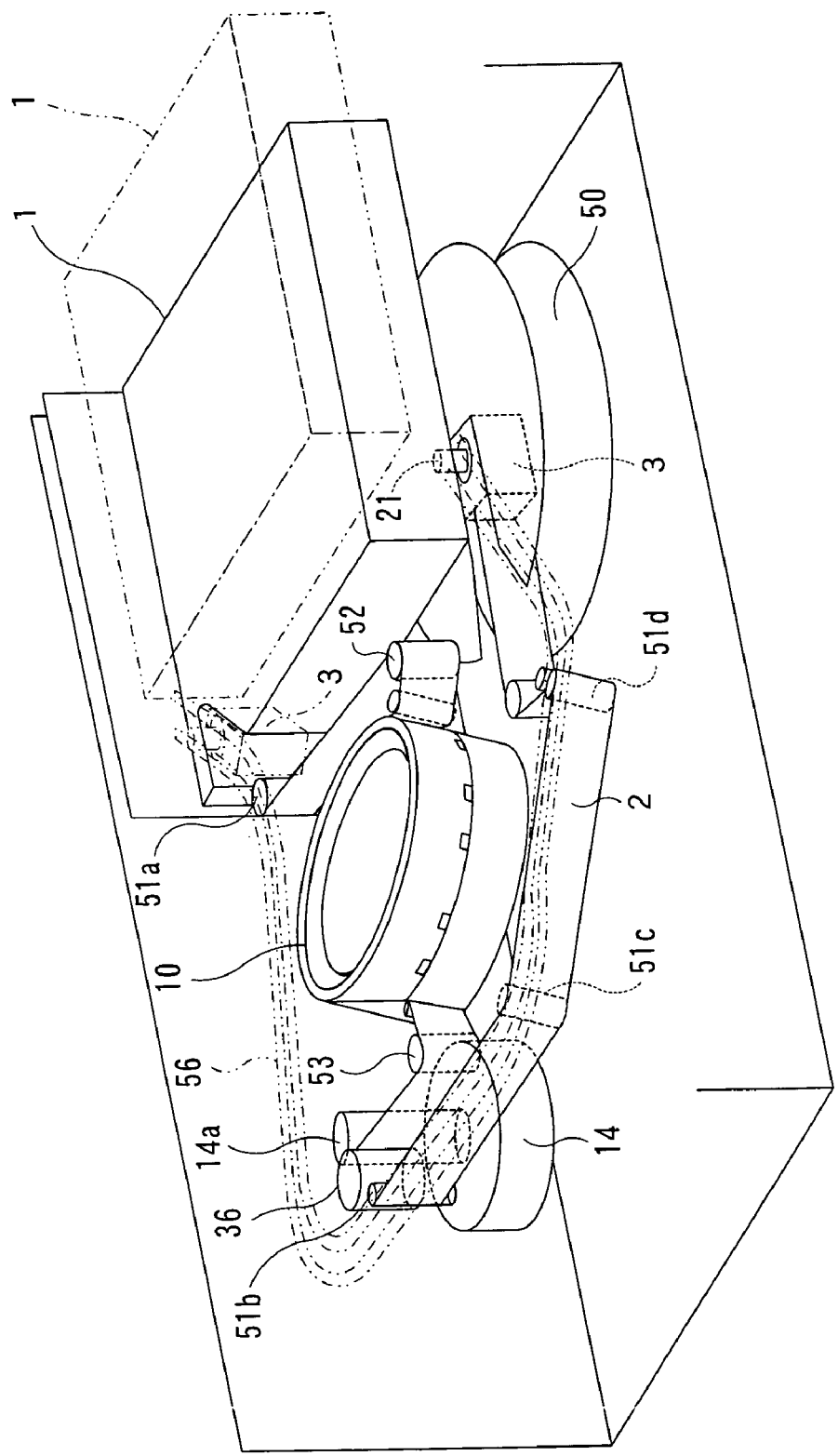
FIG. 7 is a plan view schematically showing a magnetic recording/reproducing apparatus according to still another embodiment of the present invention.
Figure 8:
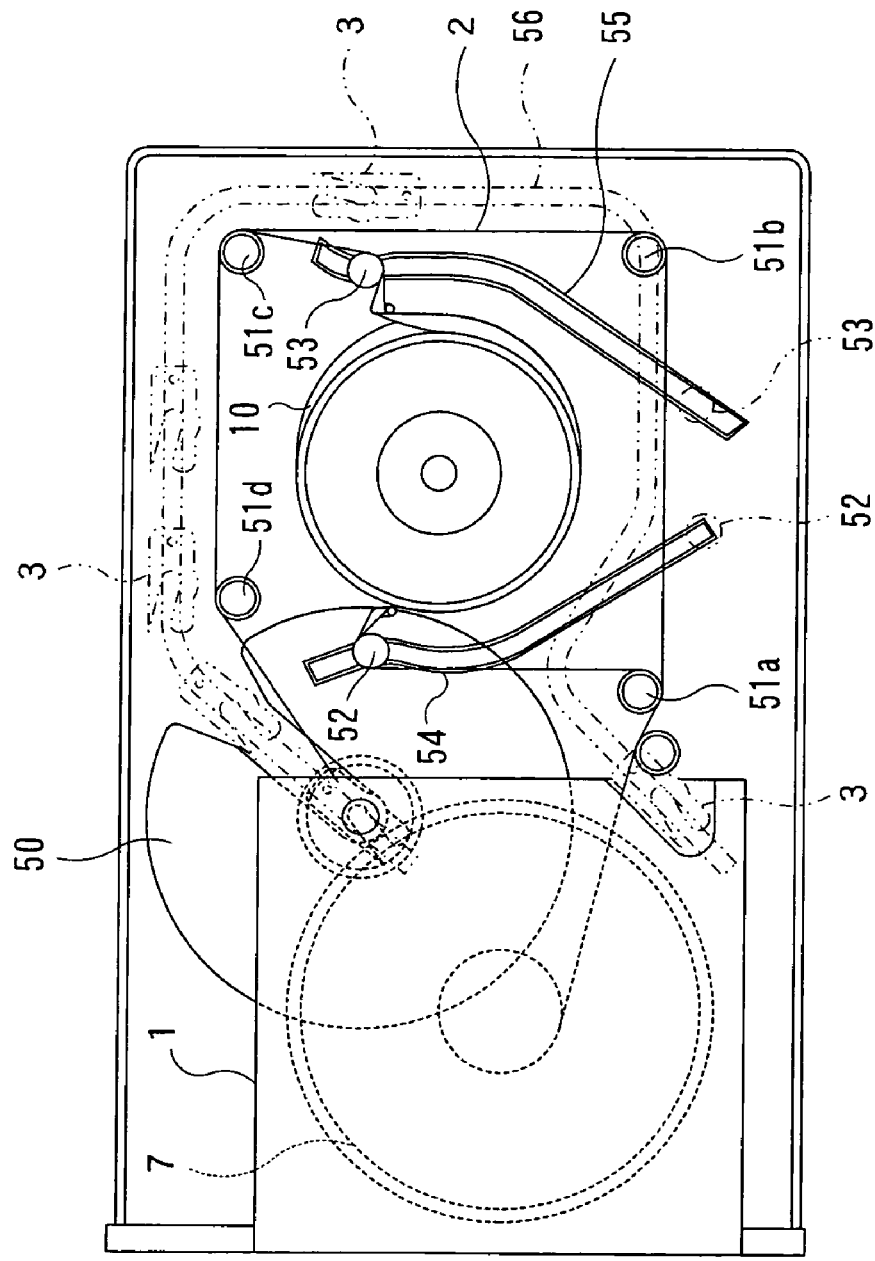
FIG. 8 is a perspective view schematically showing the magnetic recording/reproducing apparatus.
Figure 9:
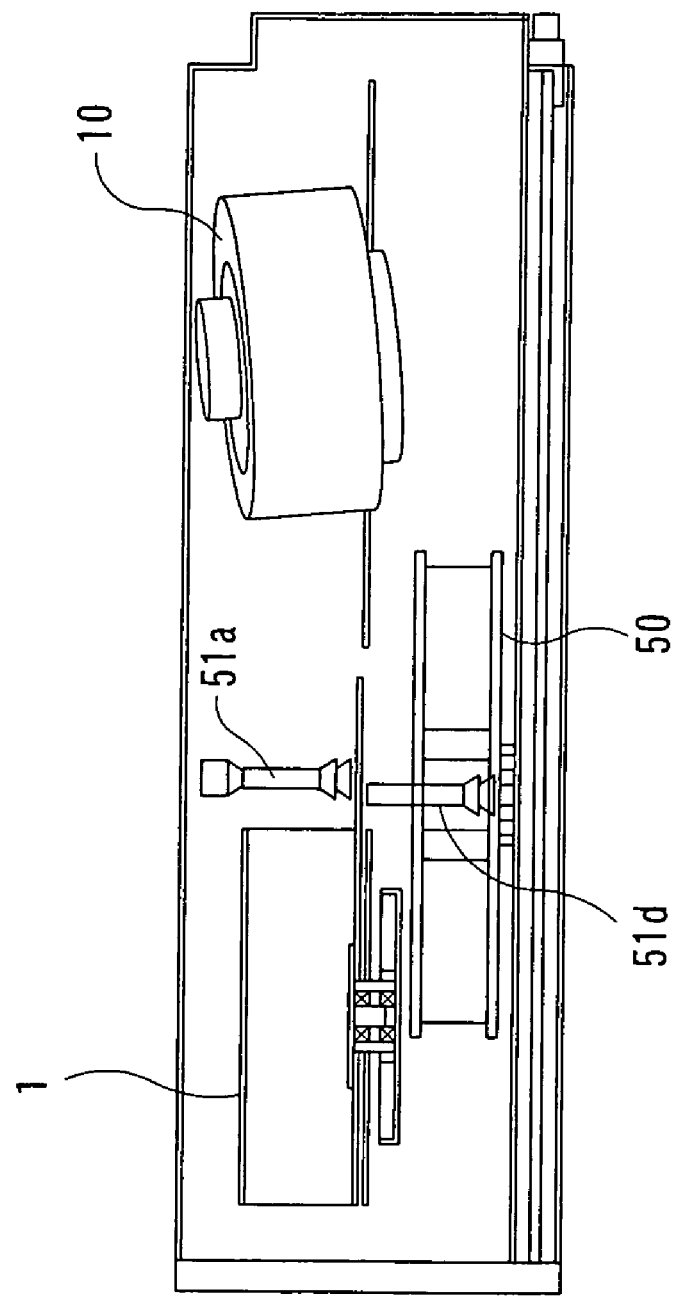
FIG. 9 is a side view schematically showing the magnetic recording/reproducing apparatus.

FIGS. 7 to 9 are a plan view, a perspective view, and a side sectional view which show a magnetic recording/reproducing apparatus according to another embodiment of the present invention. The constituent elements having the same functions as those of the magnetic recording/reproducing apparatus of the above-described embodiment are indicated by the same reference numerals and the explanation thereof is omitted.

As shown in FIGS. 7 to 9, in the magnetic recording/reproducing apparatus of the present embodiment, a take-up reel 50 and the cartridge 1 overlap each other in plan view taken along the thickness direction of a cartridge 1, and are positioned at different level positions in a vertical direction. In FIGS. 7 to 9, reference numeral 3 denotes a leader block, reference numeral 56 denotes a transfer rail for guiding the leader block 3, reference numerals 51a to 51d denote guide posts for guiding a magnetic tape, reference numerals 52 and 53 denote first and second tape guide rollers which serve as guide posts for winding the magnetic tape 2 around a rotary magnetic head 10 at a predetermined angle, and reference numerals 54 and 55 denote guide grooves for guiding the first and second tape guide rollers. The running system of the magnetic tape 2 has a multilevel configuration.

In this configuration, when the cartridge 1 is inserted into the magnetic recording/reproducing apparatus, the leader block 3, which is the medium leading edge of the cartridge 1, is drawn along the transfer rail 56. The drawn magnetic tape 2 is stored in a multilevel manner into the take-up reel 50, which is disposed below the cartridge 1 in an overlapped manner, while the magnetic tape 2 is guided by the plurality of guide posts 51a to 51d. The first and second tape guide rollers 52 and 53 disposed outside the magnetic tape 2 guided by the guide posts 51a to 51d are moved along the guide grooves 54 and 55 to the vicinity of the rotary magnetic head 10. Thus, the magnetic tape 2 is wound around the rotary magnetic head 10 at a predetermined angle and loading is completed.

Also in this configuration, since the take-up reel 50 is disposed so as to overlap the cartridge 1 in plan view taken along the thickness direction of the cartridge 1, the magnetic recording/reproducing apparatus can be reduced in installation area in plan view.

As described above, according to the present invention, a notch is formed on the hub of a take-up reel. The notch corresponds to the moving path of at least one guide post passing between a rotating drum type magnetic head and the take-up reel. Thus, the rotating drum type magnetic head and the take-up reel can be disposed close to each other. As a result, it is possible to achieve a compact magnetic recording/reproducing apparatus which comprises the rotating drum type magnetic head with a shorter length in the longitudinal direction and a smaller installation area as seen in plan view, thereby expanding the applicability of a system comprising the magnetic recording/reproducing apparatus.

Further, in the case where the magnetic tape is wound around the take-up reel for a predetermined diameter or larger, guide posts are prohibited from moving to unloading positions and are permitted to move only to half loading positions which do not interfere with the magnetic tape wound by the take-up reel, so that fast forwarding and rewinding can be performed without any problems.

Moreover, in the case where the magnetic tape is wound around the take-up reel for the predetermined diameter or larger, when an instruction to eject the cartridge is issued, the magnetic tape is completely wound up into the cartridge and then the guide posts are moved to the unloading positions. Thus, when an instruction to eject the cartridge is issued, a return is made to a standby state without any problems.

Furthermore, the take-up reel and the cartridge overlap each other in plan view taken along the thickness direction of the cartridge, and are located at different positions in a vertical direction. Also with this configuration, it is possible to reduce the installation area of the magnetic recording/reproducing apparatus as seen in plan view, thereby expanding the applicability of a system comprising the magnetic recording/reproducing apparatus.

The invention claimed is:

1. A magnetic recording/reproducing apparatus, in which a single reel cartridge having stored a magnetic tape is freely attached and detached, comprising:

a take-up reel for winding up a magnetic tape drawn from a cartridge;

a rotating drum type magnetic head for performing recording and reproduction on the magnetic tape;

a transporting/connecting mechanism for transporting and connecting a leading edge of the magnetic tape to the take-up reel when the cartridge is mounted; and a plurality of guide posts disposed at predetermined unloading positions when the magnetic tape is not connected to the take-up reel and, after the leading edge of the magnetic tape is connected to the take-up reel, moved to predetermined loading positions to guide the magnetic tape to be wound around the rotating drum type magnetic head along predetermined moving paths, wherein the take-up reel has a hub formed with a notch corresponding to the moving path of at least one of the guide posts passing between the rotating drum type magnetic head and the take-up reel.

2. The magnetic recording/reproducing apparatus according to claim 1, wherein when the magnetic tape is wound around the take-up reel for a predetermined diameter or larger, the guide posts are prohibited from moving to the unloading positions and are permitted to move only to half loading positions where the guide posts do not interfere with the magnetic tape wound around the take-up reel.

3. The magnetic recording/reproducing apparatus according to claim 1, wherein when the magnetic tape is wound around the take-up reel for a predetermined diameter or larger, the magnetic tape is completely wound up into the cartridge and then the guide posts are moved to the unloading positions when an instruction to eject the cartridge is issued.

* * * * *